US008566334B2

(12) United States Patent
Lehtipalo et al.

(10) Patent No.: US 8,566,334 B2
(45) Date of Patent: Oct. 22, 2013

(54) DATA VISUALIZATION SYSTEM WITH AXIS BINDING

(75) Inventors: Tobias Lehtipalo, Västra Frölunda (SE); Johan Thoresson, Göteborg (SE); Tommy Fortes, Göteborg (SE); Daniel Vulcan, Göteborg (SE); Mattias Wallerstedt, Billdal (SE)

(73) Assignee: Spotfire AB, Gothenburg (SE)

( * ) Notice: Subject to any disclaimer, the term of this patent is extended or adjusted under 35 U.S.C. 154(b) by 193 days.

(21) Appl. No.: 11/824,502

(22) Filed: Jun. 29, 2007

(65) Prior Publication Data
US 2009/0006319 A1    Jan. 1, 2009

(51) Int. Cl.
*G06F 17/30*   (2006.01)

(52) U.S. Cl.
USPC .......................................... 707/758; 707/782

(58) Field of Classification Search
USPC ................................... 707/2, 3, 100, 781, 782
See application file for complete search history.

(56) References Cited

U.S. PATENT DOCUMENTS

| 6,014,661 A * | 1/2000 | Ahlberg et al. ................... 707/3 |
| 2005/0091252 A1* | 4/2005 | Liebich et al. ............... 707/102 |
| 2007/0053367 A1* | 3/2007 | Tyebji ........................... 370/401 |
| 2008/0215554 A1* | 9/2008 | Redburn .......................... 707/3 |

* cited by examiner

*Primary Examiner* — Christyann Pulliam
*Assistant Examiner* — Fariborz Khoshnoodi
(74) *Attorney, Agent, or Firm* — Kristofer E. Elbing (57) ABSTRACT

In one general aspect, the application discloses a data visualization method that includes accessing data tables and receiving an axis binding definition for a particular visualization that relates values in a first of the tables to sets of fields in a second of the tables. A marking indication can then be received that selects one of the values in the first of the tables, and a set of fields in the second table is accessed based on the marking indication and the axis binding definition. This accessed set of fields is presented in the particular visualization for which the axis binding definition was received.

20 Claims, 8 Drawing Sheets

DATA VISUALIZATION SYSTEM WITH AXIS BINDING

FIELD OF THE INVENTION

This invention relates to the field of data visualization, including the design of data visualization systems.

BACKGROUND OF THE INVENTION

The modern world is seemingly flooded with data but is often at a loss for interpreting it. One exceptionally useful tool that has found wide acceptance is software that presents the data in some visual form, especially in a way that makes relationships noticeable. Using this software, often very complex databases can be queried. The results of the queries are then analyzed and displayed in some visual format, usually graphical, such as a bar or pie chart, scatter plot, or any of a large number of other well-known formats. Modern analysis tools then allow the user to dynamically adjust the ranges of the displayed results in order to change and see different aspects of the analysis.

One prominent data visualization product is owned by Spotfire AB of Göteborg, Sweden, and marketed under the name DecisionSite.® In this product, which incorporates the technology disclosed in U.S. Pat. No. 6,014,661, query devices tied to columns in the data set and different visualizations of the data allow users to dynamically filter their data sets based on any available property, and hence to interactively visualize the data. As the user adjusts graphical query devices such as rangesliders and alphasliders, the DecisionSite product changes the visualization of the data accordingly.

The DecisionSite product also includes several other automatic features, such as initial selection of suitable query devices and determination of ranges, which aid the user not only to visualize the data, but also to mine it. When properly used, this technique constitutes a powerful tool that forms the basis for sophisticated data exploration and decisionmaking applications.

Overall, visualization products have improved the efficiency and enhanced the capabilities of professionals in a wide range of areas of data analysis. But these individuals are typically highly trained and highly paid, and they can still spend long periods of time in their data analysis tasks. Improvements in capabilities of data visualization tools could therefore bring further improvements to the efficiency and quality of tasks performed by individuals working in a variety of fields.

SUMMARY OF THE INVENTION

In one general aspect, the invention features a data visualization system that includes access logic operative to access a plurality of tables and query device presentation logic operative to present a plurality of query devices that are responsive to user interaction and that correspond to at least some of the fields in the tables. The system also includes visualization logic operative to display one or more visualizations that present visual elements that are responsive to filtering functions defined by the query devices and that correspond to at least some of the fields in the tables accessed by the access logic, and axis binding logic responsive to the selection of a value in a first of the tables to define a set of fields in a second table to be accessed in one or more of the visualizations.

In preferred embodiments, the visualization configured by the axis binding control can be a chart, such as a line chart, bar chart, or pie chart. The axis binding control can also be a map or a plot, such as a scatter plot. The first table can be a table of properties with the second table being a table of experimental results. The system can further include an axis binding definition interface responsive to user input to define an axis binding definition for use by the axis binding logic. The axis binding definition interface can include an expression definition interface operative to create an axis binding definition that includes an expression. The axis binding definition interface can include an expression definition interface operative to create a column-based axis binding definition. The expression definition interface can create an expression that determines which column to assign to an axis. The expression definition interface can create an expression that can include a plurality of the following functions: binning functions, conversion functions, date and time functions, logical functions, math functions, operators, statistical functions, and text functions.

In another general aspect, the invention features a data visualization method that includes accessing a plurality of data tables, receiving an axis binding definition for a particular visualization that relates values in a first of the tables to sets of fields in a second of the tables, receiving a marking indication that selects one of the values in the first of the tables, accessing a set of fields in the second table based on the marking indication and the axis binding definition, and presenting the accessed set of fields in the particular visualization for which the axis binding definition was received.

In preferred embodiments, the method can further include the steps of receiving an additional axis binding definition for an additional particular visualization that relates values in a one of the tables to sets of fields in another of the tables, and presenting an accessed set of fields in the additional particular visualization for which the additional axis binding definition was received. The axis binding definition and the additional axis binding definition can relate to different visualizations but a same relationship between the first and second tables. The axis binding definition and the additional axis binding definition can relate to different visualizations and different relationships between the first and second tables. The additional axis binding definition can relate to at least a third table.

In a further general aspect, the invention features a data visualization system that includes means for accessing a plurality of data tables, means for receiving an axis binding definition for a particular visualization that relates values in a first of the tables to sets of fields in a second of the tables, means for receiving a marking indication that selects one of the values in the first of the tables, means for accessing a set of fields in the second table based on the marking indication and the axis binding definition, and means for presenting the accessed set of fields in the particular visualization for which an axis binding definition was received.

Systems according to the invention allow users to easily and interactively explore different data sets that relate differently to a particular set of elements. Such systems are particularly well suited to working with data that are orthogonal to each other. Tables of chemical properties and experimental results, for example, can be quickly accessed in a way that is well suited to exploring the how the properties cause the results.

DETAILED DESCRIPTION OF AN ILLUSTRATIVE EMBODIMENT

Figure 1:
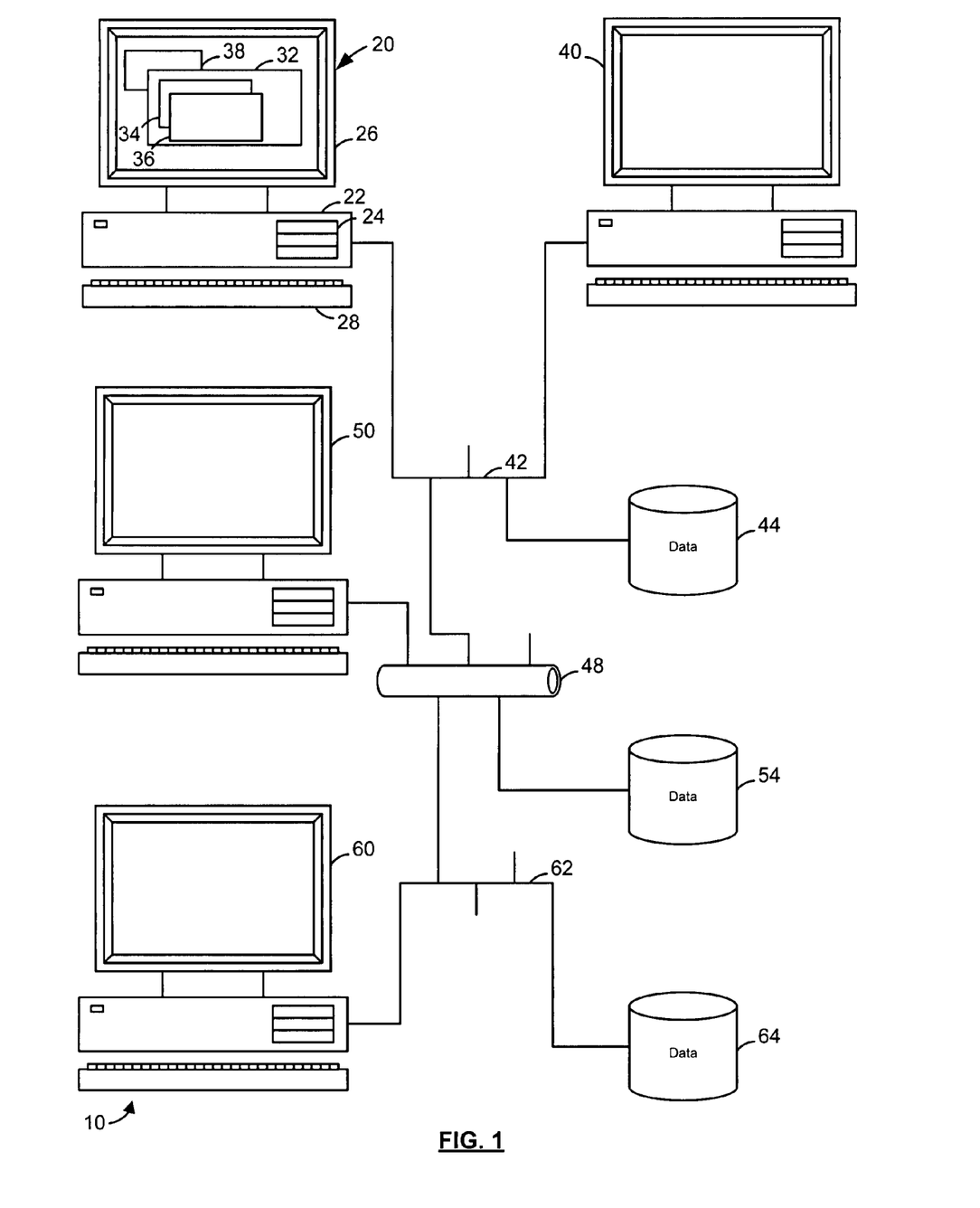
FIG. 1 is a block diagram showing an illustrative embodiment of a data visualization system according to the invention and its operating environment.

Referring to FIG. 1, an illustrative interactive data visualization system 10 according to the invention can run on one or more interacting platforms. In this embodiment, the system includes a first workstation 20, which comprises a processing unit 22, and storage 24. The storage includes high-speed storage, such as RAM, and mass storage, such as disk storage. The workstation also includes a display 26 and one or more input devices, including a keyboard 28 and a pointing device (e.g., a mouse). The workstation in this embodiment conforms to the so-called IBM-PC standard and is equipped with the well-known Microsoft Windows® operating system that enables its user to launch one or more application programs, although the system could also use other platforms, such as Apple McIntosh®, Linux®, or UNIX®-based platforms. Other types of platforms could also be supported, such as PDA's or mobile telephones.

The workstation 10 has access to a visualization application that can present one or more visualization application screens 32, 38 on its display. These visualization screens can each present one or more visualization windows 34, 36. And, as will be discussed in more detail below, the visualization windows can also be made up of two or more visualizations. Generally, the visualization program will be stored in and run from the workstation's mass storage.

The workstation also includes a network interface that allows it to be connected to other workstations (e.g., 40) and/or network storage 44 via a private Local Area Network (LAN) 42, such as an Ethernet® LAN. The private network is connected to a public network 48, such as the internet, which can be connected to other workstations (e.g., 50) and/or network storage (e.g., 44). Other private networks (e.g., 62) can be connected to the public network as well, and can include further workstations (e.g., 60) and/or network storage (e.g., 64). One of ordinary skill in the art will immediately recognize that an essentially unlimited number of combinations of workstations, storage, private networks, and public networks can be assembled, and that the system shown in FIG. 1 is simply one example of many possible implementations.

Figure 2:
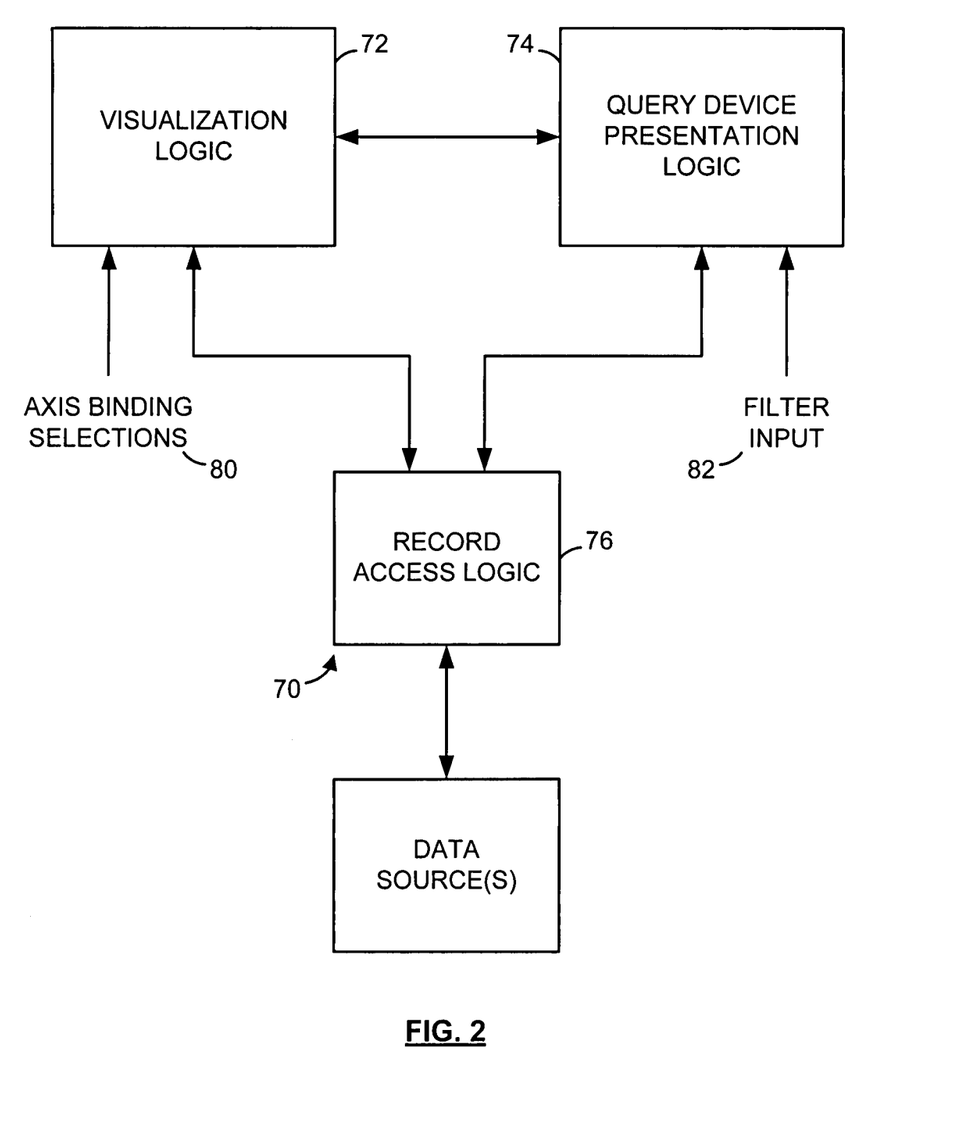
FIG. 2 is a block diagram of a multi-source visualization application for use with the system of FIG. 1.

Referring to FIG. 2, the visualization application 70 includes visualization logic 72, query device presentation logic 74, and record access logic 76. The combined visualization logic includes visualization presentation functionality, as described in more detail in U.S. Pat. No. 6,014,661, although it has been enhanced to allow it to perform axis binding functions in response to a user's axis binding selections 80. The query device presentation logic includes query device presentation functionality that allows it to present query devices that apply filtering functions that determine what data are displayed in visualizations presented by the combined visualization logic based on user input 82, as described in more detail in U.S. Pat. No. 6,014,661. The record access logic should preferably be capable of accessing more than one data set, as described in a copending application entitled "MULTI-SOURCE DATA VISUALIZATION SYSTEM," Ser. No. 11/824,471, filed on the same day as this application and herein incorporated by reference.

Figure 3:
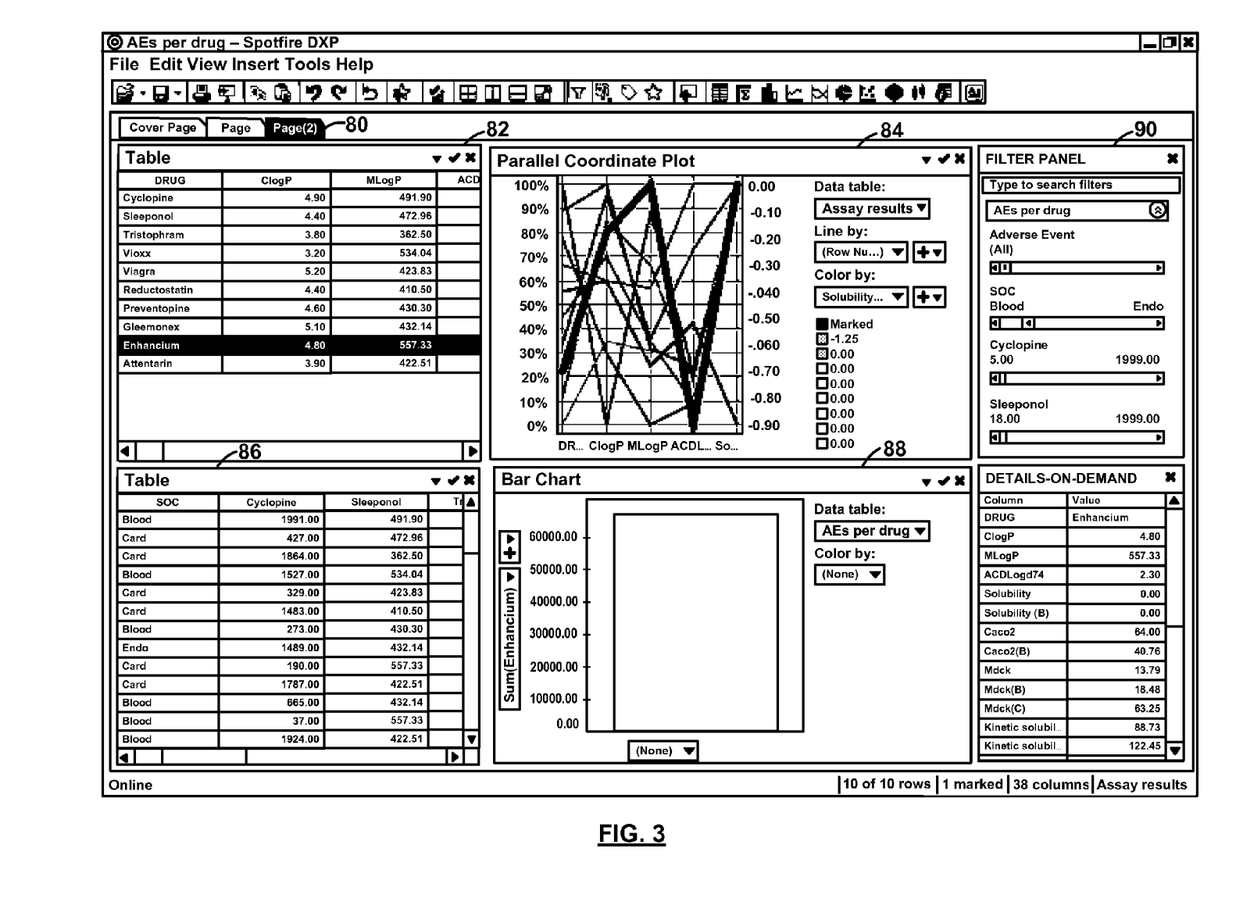
FIG. 3 is a screenshot of a visualization screen for the system of FIG. 1 for two preloaded illustrative two data sets.

In operation, referring to FIG. 3, the visualization application 70 presents the user with the ability to create one or more visualization pages (e.g., 80) for a data set in a visualization window. A visualization page can include one or more visualizations, such as a first data table 82, a parallel coordinate plot 84, a second data table 86, and a bar chart 88. A filter panel 90 allows the user to interactively select data to be shown in the visualizations on the visualization page.

There are two illustrative data sets that populate the visualizations shown in FIG. 3. The first is an assay results table 82 for a series of drugs, and the second is an adverse event table 86 for the same series of drugs. The second table therefore has a series of column labels (i.e., drug names) that are listed in one of the columns of the first table.

Figure 4:
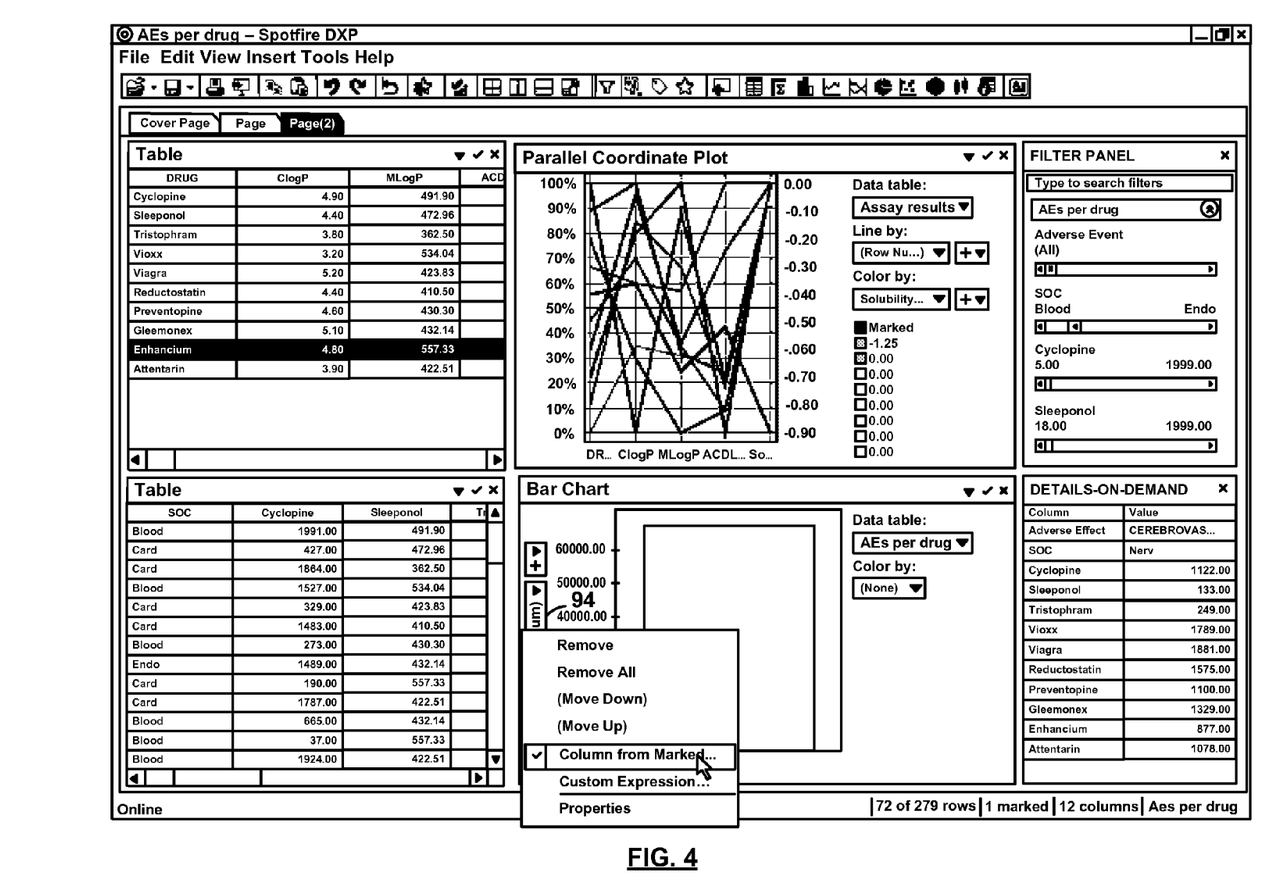
FIG. 4 is a screenshot of the visualization screen for the system of FIG. 1 showing a drop-down menu that includes a "Column from Marked" entry.

Referring to FIG. 4, the visualization application provides a "Column from Marked" function that performs axis binding and is available from a drop-down menu 92 associated with an axis selector control 94 for one ore more of the visualizations (e.g., the bar chart 88). When the user selects this entry, it causes the visualization application to present a "Column from Marked" dialog 100 (see FIG. 5). This dialog includes a data table selector pick list 102, a column selector pick list 104, and a row from marking selector pick list 106. It also includes an optional advanced expression text box 108 and a sample text box 110.

Figure 5:
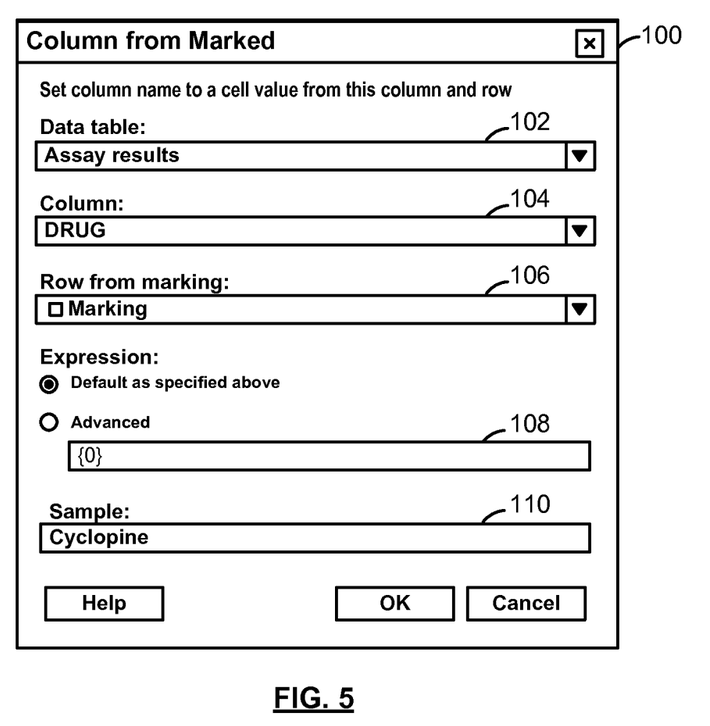
FIG. 5 is a screenshot of a "Column from Marked" dialog for the system of FIG. 1.

The data table selector pick list 102 lists the available data tables for selection by the user. The column selector pick list 104 lists the available columns in the selected data table, and allows the user to select the column containing all column names that should appear on the selected axis upon marking. The row from marking selector pick list allows the user to select one of the available markings to define what is shown in the visualization in the direction of the selected axis. If more than one item is marked, the first item will be used to define the value to use on the axis.

The user can enter an advanced expression into the advanced expression text box. This expression will be applied to the data before it is plotted on the selected axis. A log function can be specified, for example, to cause the selected axis to use a log scale. Aggregation functions can also be specified. The expression is evaluated in real time as the visualization is displayed. Actuating an OK button on the dialog 100 sets up the visualization.

Figure 6:
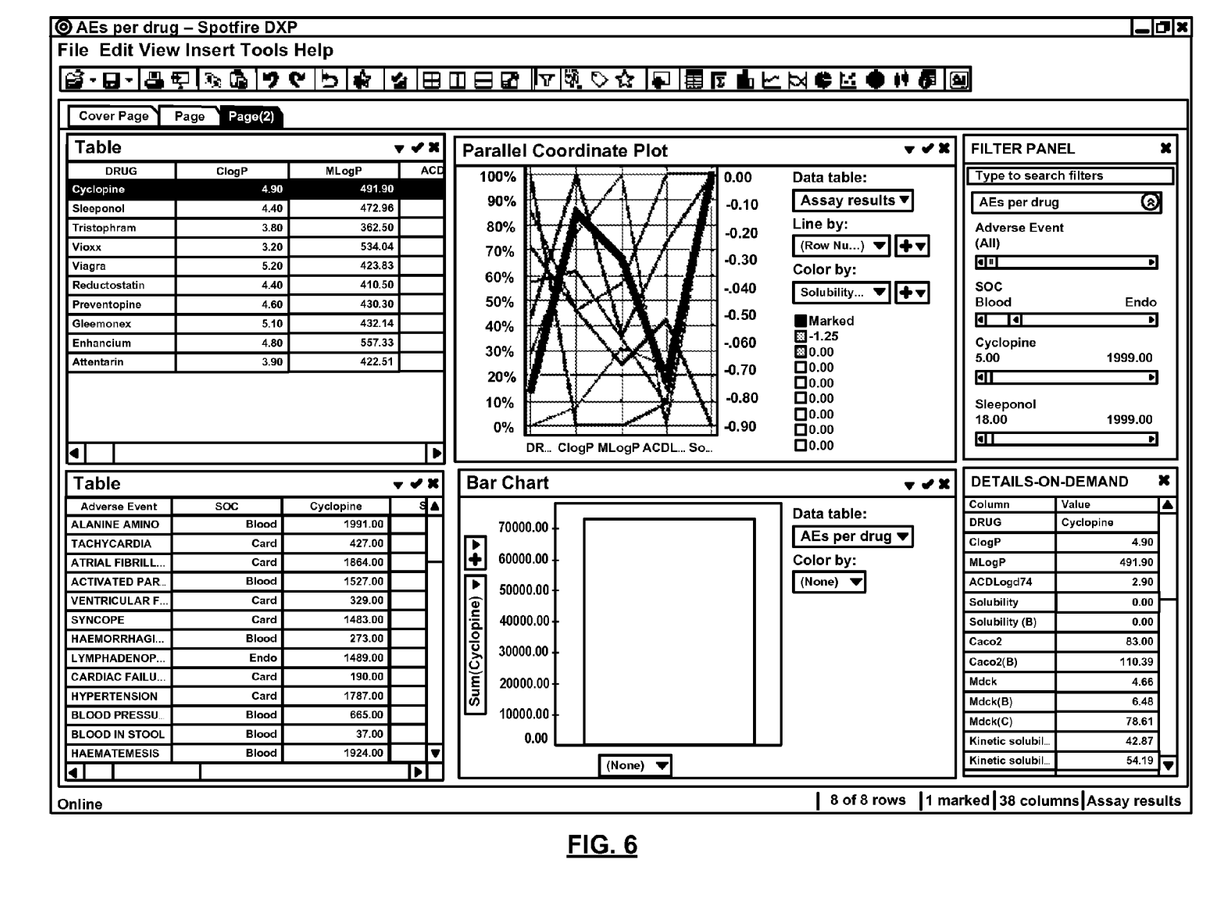
FIG. 6 is a screenshot of a visualization screen for the system of FIG. 1 with a first row marked in a first table and the resulting effect on a bar chart visualization.

Referring to FIG. 6, activating the axis binding function for a selected axis causes the name of the selected column in the second table designated by the currently marked row of the first table to appear in an axis selector/label. If an expression was specified, the expression is shown in the axis selector/label. The visualization then displays the results from the column selected in the second table. In the illustrated case, the results are displayed as a sum of adverse events from the column in the second table for the drug in the row selected in table 1. In short, the axis binding function fetches, based on a field entry in a selected marked row in a first table, the names of columns to display from a second table.

Figure 7:
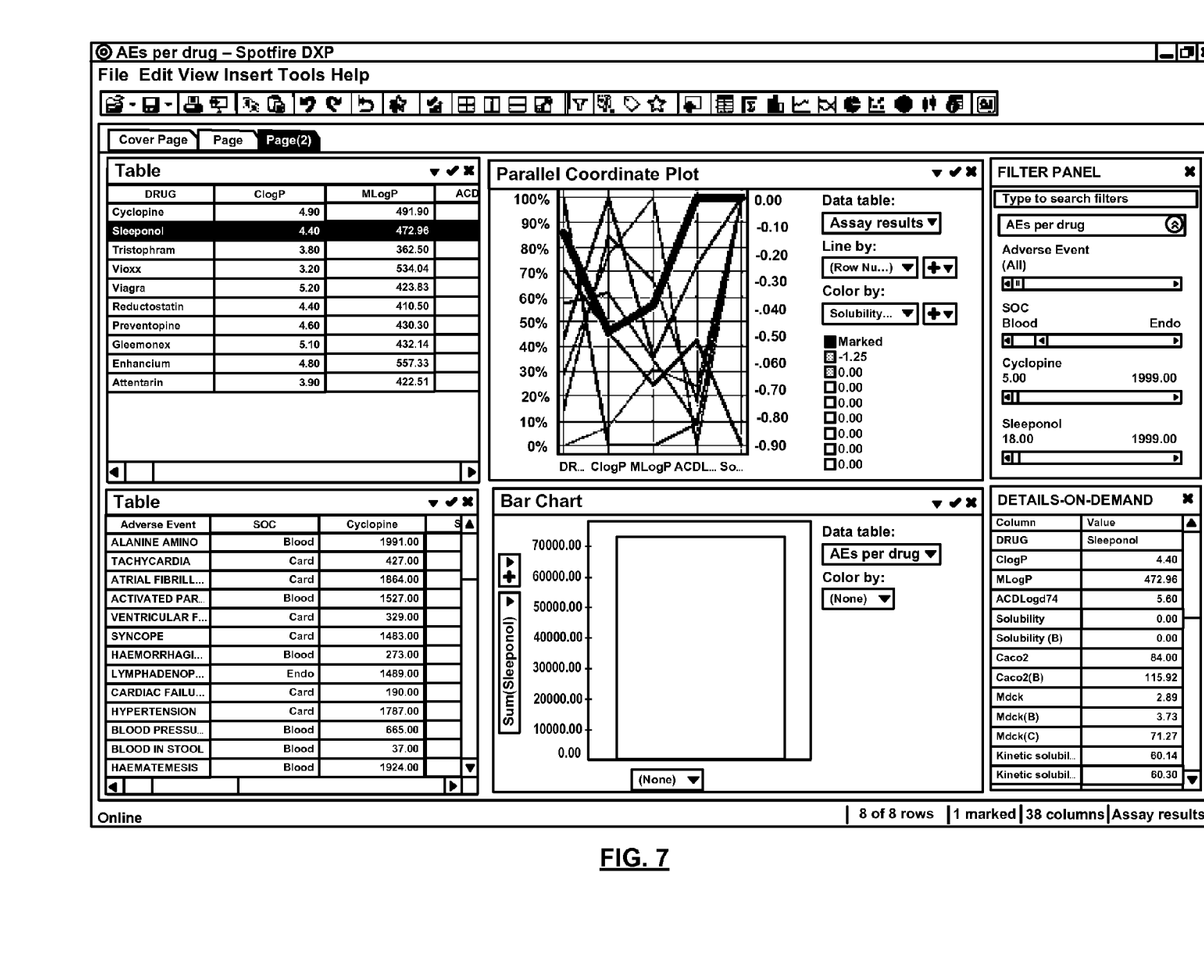
FIG. 7 is a screenshot of the visualization screen for the system of FIG. 1 with a second row marked in a first table and the resulting effect on a bar chart visualization.

Referring to FIG. 7, selecting a new record (row) in the first table causes a new column to be selected from the second table. This changes the axis label 94 to reflect the new column name, as modified by any expressions. The visualization is also updated with the newly selected second table column data. Although a bar chart was chosen to as an illustration in this application, numerous other types of visualizations could also be defined and manipulated, such as scatter plots (two- and three-dimensional), pie charts, line charts, parallel coordinate plots, heat maps, tree maps, box plots, and cross tables (sometimes called pivot tables). Other properties of the visualizations can also be driven by the mechanism, such as the size, coloring, and type of markers, as well as trellis conditions.

The axis binding mechanism can also be applied to more than one visualization. Multiple tables can support different axis binding definitions to produce multiple independent instances of axis binding. The selection in one visualization can also drive the properties of multiple visualizations based on the second table. And the selection in one visualization can drive the use of columns in multiple tables and multiple visualizations.

As presented in the example described above, custom expressions can allow a user to change a visualization presented on an axis in real time. The same kinds of custom expressions can also be used to insert a calculated column in a data table, much as could be done with a spreadsheet. Both types of expressions can be simply typed or defined using a custom expression dialog.

Figure 8:
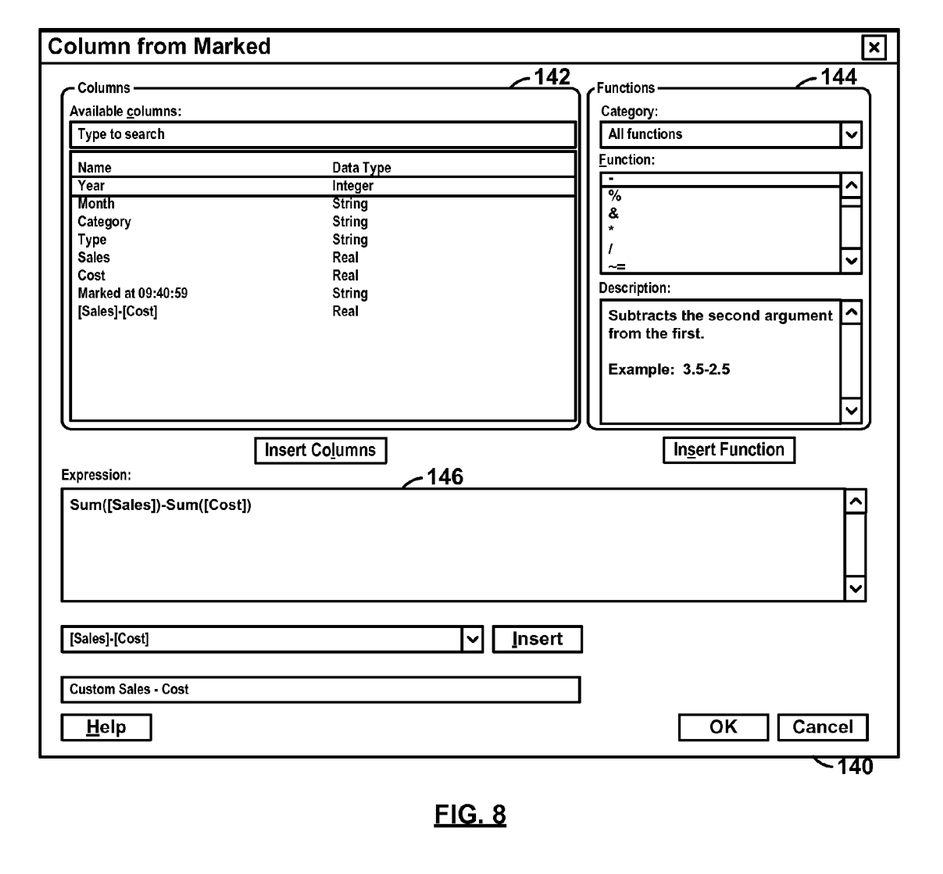
FIG. 8 is a screenshot of a "Custom Expression" dialog for the system of FIG. 1.

Referring to FIG. 8, a custom expression dialog 140 includes a column selection tool 142 and a function selection tool 144. The column selection tool allows the user to insert column names into an expression shown in an expression authoring area 146, and the result of the expression can determine which column to display. The function selection tool allows a user to select and insert functions into an expression authoring area 146. Like a spreadsheet or other types of analysis programs, the visualization application can support a variety of different types of functions, such as binning functions, conversion functions, date and time functions, logical functions, math functions, operators, statistical functions, and text functions.

The system described above has been implemented using a special-purpose software program running on a general-purpose computer platform, but it could also be implemented in whole or in part using special-purpose hardware. In addition, while the system can be broken into the series of modules shown in FIG. 2, one of ordinary skill in the art would recognize that it is also possible to combine them and/or split them to achieve a different breakdown. And while the present embodiment shows tables, filters and/or visualizations in panels of a same visualization page, it is also possible to use other spatial organization schemes, such separate floating windows for all visualization elements. It should be noted as well that the system described in this application can open multiple visualization windows that each include pages that operate on more than one data table.

The present invention has now been described in connection with a number of specific embodiments thereof. However, numerous modifications which are contemplated as falling within the scope of the present invention should now be apparent to those skilled in the art. For example, while records are generally treated as rows with fields organized in columns, other systems might organize data in other ways. It is therefore intended that the scope of the present invention be limited only by the scope of the claims appended hereto. In addition, the order of presentation of the claims should not be construed to limit the scope of any particular term in the claims.

What is claimed is:

1. A data visualization system comprising a processor and a storage device including instructions that are configured to run on the processor, comprising:
   access logic configured to access a plurality of data tables, each including a plurality of records that each include values for a plurality of fields,
   query device presentation logic configured to present a plurality of query devices that are responsive to pointing device-based user interaction and that correspond to at least some of the fields in the tables,
   visualization logic configured to simultaneously display a plurality of visualizations that each present visual elements that are responsive to filtering functions defined by the query devices, wherein a first of the visualizations corresponds to at least some of the fields in a first of the tables, and a second of the visualizations corresponds to at least some of the fields in a second of the tables, and
   axis binding logic responsive to the selection of a value in the first of the tables to define a set of fields in the second of the tables to access in presenting the second visualization to allow pointing device-based user interaction corresponding to the first visualization to cause the second visualization to update, and wherein the axis binding logic is operative to 1) receive a first pointer-based marking indication that selects a first portion of the first visualization corresponding to one of the values in the first of the tables, 2) access a first set of fields in the second table based on the first marking indication and the axis binding definition, 3) present the first accessed set of fields in the second particular visualization for which the axis binding definition was received, 4) receive a second pointer-based marking indication that selects a second portion of the first particular visualization corresponding to another of the values in the first of the tables, 5) access a second set of fields in the second table based on the second marking indication and the axis binding definition, and 6) present the second accessed set of fields in the second particular visualization for which the axis binding definition was received.

2. The system of claim 1 wherein the visualization configured by the axis binding control is a chart.

3. The system of claim 2 wherein the visualization configured by the axis binding control is a line chart.

4. The system of claim 2 wherein the visualization configured by the axis binding control is a bar chart.

5. The system of claim 3 wherein the visualization configured by the axis binding control is a pie chart.

6. The system of claim 1 wherein the visualization configured by the axis binding control is a map.

7. The system of claim 1 wherein the visualization configured by the axis binding control is a plot.

8. The system of claim 7 wherein the visualization configured by the axis binding control is a scatter plot.

9. The system of claim 1 wherein the first table is a table of properties and the second table is a table of experimental results.

10. The system of claim 1 further including an axis binding definition interface responsive to user input to define an axis binding definition for use by the axis binding logic.

11. The system of claim 1 wherein the axis binding definition interface includes an expression definition interface configured to create an axis binding definition that includes an expression.

12. The system of claim 11 wherein the axis binding definition interface includes an expression definition interface configured to create a column-based axis binding definition.

13. The system of claim 12 wherein the expression definition interface is configured to create an expression that determines which column to assign to an axis.

14. The system of claim 11 wherein the expression definition interface is configured to create an expression that can include a plurality of the following functions: binning functions, conversion functions, date and time functions, logical functions, math functions, operators, statistical functions, and text functions.

15. A data visualization method, comprising:
    accessing a plurality of data tables each including a plurality of records that each include values for a plurality of fields,
    receiving an axis binding definition for a plurality of particular visualizations that relate values in a first of the tables to sets of fields in a second of the tables, wherein a first of the particular visualizations corresponds to at least some of the values in a first of the tables, and a second of the particular visualizations corresponds to at least some of the fields in a second of the tables,
    receiving pointer-based filtering commands for at least some of the fields in the tables,
    receiving a first pointer-based marking indication that selects a first portion of the first particular visualization corresponding to one of the values in the first of the tables,
    accessing a first set of fields in the second table based on the first marking indication and the axis binding definition,
    presenting the first accessed set of fields in the second particular visualization for which the axis binding definition was received,
    receiving a second pointer-based marking indication that selects a second portion of the first particular visualization corresponding to another of the values in the first of the tables,
    accessing a second set of fields in the second table based on the second marking indication and the axis binding definition, and
    presenting the second accessed set of fields in the second particular visualization for which the axis binding definition was received.

16. The method of claim 15 further including the steps of receiving an additional axis binding definition for an additional particular visualization that relates values in a one of the tables to sets of fields in another of the tables, and presenting an accessed set of fields in the additional particular visualization for which the additional axis binding definition was received.

17. The method of claim 16 wherein the axis binding definition and the additional axis binding definition relate to different visualizations but a same relationship between the first and second tables.

18. The method of claim 16 wherein the axis binding definition and the additional axis binding definition relate to different visualizations and different relationships between the first and second tables.

19. The method of claim 16 wherein the additional axis binding definition relates to at least a third table.

20. A data visualization system comprising a processor and a storage device including instructions that are configured to run on the processor, comprising:
    means for accessing a plurality of data tables each including a plurality of records that each include values for a plurality of fields,
    means for receiving an axis binding definition for a plurality of particular visualizations that relate values in a first of the tables to sets of fields in a second of the tables, wherein a first of the particular visualizations corresponds to at least some of the values in a first of the tables, and a second of the particular visualizations corresponds to at least some of the fields in a second of the tables,
    means for receiving pointer-based filtering commands for at least some of the fields in the tables,
    means for receiving a first pointer-based marking indication that selects a first portion of the first particular visualization corresponding to one of the values in the first of the tables,
    means for accessing a first set of fields in the second table based on the first marking indication and the axis binding definition,
    means for presenting the first accessed set of fields in the second particular visualization for which the axis binding definition was received,
    means for receiving a second pointer-based marking indication that selects a second portion of the first particular visualization corresponding to another of the values in the first of the tables,
    means for accessing a second set of fields in the second table based on the second marking indication and the axis binding definition, and
    means for presenting the second accessed set of fields in the second particular visualization for which the axis binding definition was received.

* * * * *